US012440863B2

(12) United States Patent
Aherne et al.

(10) Patent No.: US 12,440,863 B2
(45) Date of Patent: *Oct. 14, 2025

(54) MOUNTING OF AN AEROSOL GENERATOR APERTURE PLATE TO A SUPPORT

(71) Applicant: STAMFORD DEVICES LIMITED, Galway (IE)

(72) Inventors: Michael Aherne, Galway (IE); Colga Coye, County Galway (IE); Philip Scanlon, Galway (IE)

(73) Assignee: STAMFORD DEVICES LIMITED, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,462

(22) Filed: Jan. 30, 2023

(65) Prior Publication Data

US 2023/0166284 A1 Jun. 1, 2023

Related U.S. Application Data

(63) Continuation of application No. 16/756,204, filed as application No. PCT/EP2018/082708 on Nov. 27, 2018, now Pat. No. 11,654,448.

(30) Foreign Application Priority Data

Dec. 14, 2017 (EP) .................................... 17207276

(51) Int. Cl.
*B05B 17/06* (2006.01)
*B05B 17/00* (2006.01)

(52) U.S. Cl.
CPC ................................ *B05B 17/0646* (2013.01)

(58) Field of Classification Search
CPC ..... B05B 17/0646; B05B 17/00; B05B 17/06; B05B 17/0669; B05B 7/0483; B23P 19/00; B25B 27/00
See application file for complete search history.

(56) References Cited

U.S. PATENT DOCUMENTS

| | | | | |
|---|---|---|---|---|
| 9,452,441 B2 * | 9/2016 | Hsieh | .................. | B05B 17/0646 |
| 2006/0207591 A1 * | 9/2006 | Gallem | ............... | B05B 17/0646 128/200.22 |

(Continued)

FOREIGN PATENT DOCUMENTS

| | | | |
|---|---|---|---|
| CN | 201371109 | Y | 12/2009 |
| DE | 10 2009 017 492 | A1 | 12/2010 |

(Continued)

OTHER PUBLICATIONS

International Search Report mailed Jan. 25, 2019 in International Application No. PCT/EP2018/082708 (5 pages).

*Primary Examiner* — Qingzhang Zhou
(74) *Attorney, Agent, or Firm* — Bookoff McAndrews, PLLC

(57) ABSTRACT

An aperture plate (1) is attached at its rim (203) to a support washer (3) by adhesive. Anchor grooves (204) having a zig-zag pattern in plan are machined in the lower surface of the rim (203 of the aperture plate before application of the adhesive. The grooves (204) extend out to the edge of the aperture plate (1). The anchor grooves have a depth in the range of 10 μm to 40 μm, and a width in the range of 20 μm to 150 μm, and an angular pitch in the range of 2.5° to 12.5°. Excellent bonding strength is achieved for long term reliable attachment in an environment of high frequency vibration and moisture and chemical corrosion.

20 Claims, 5 Drawing Sheets

(56) References Cited

U.S. PATENT DOCUMENTS

| | | | |
|---|---|---|---|
| 2011/0233302 | A1 | 9/2011 | Lin et al. |
| 2012/0111970 | A1* | 5/2012 | Hogan ................. A61M 11/005 239/102.2 |
| 2013/0112770 | A1 | 5/2013 | Hsieh et al. |
| 2015/0122906 | A1 | 5/2015 | Kawano et al. |
| 2019/0038851 | A1 | 2/2019 | Hijlkema |

FOREIGN PATENT DOCUMENTS

| | | | |
|---|---|---|---|
| EP | 3 127 616 | A1 | 2/2017 |
| JP | 59-132961 | A | 7/1984 |
| JP | 59-132964 | A | 7/1984 |
| JP | 59132964 | * | 7/1984 |
| JP | 60-175566 | A | 9/1985 |
| WO | 2007/012215 | A1 | 2/2007 |
| WO | 2012/046220 | A1 | 4/2012 |
| WO | 2012/092163 | A1 | 7/2012 |
| WO | 2013/186031 | A1 | 12/2013 |
| WO | 2017/137252 | A1 | 8/2017 |

* cited by examiner

MOUNTING OF AN AEROSOL GENERATOR APERTURE PLATE TO A SUPPORT

FIELD OF THE INVENTION

The invention relates to mounting of vibratable elements in medical devices, where the vibratable element has a maximum width dimension of up to a few centimetres, but especially medical devices where this dimension is several millimetres. An example is mounting an aperture plate to a support in an aerosol generator.

PRIOR ART DISCUSSION

The environment within an aerosol generator is not conducive to maintenance of a good seal between elements, and especially the aperture plate onto the support. The aperture plate may for example vibrate at a frequency of 128 kHz, and of course only a small portion of its surface can be attached to the support. Also, the environment is humid. For these reasons it is a particular challenge to manufacture in a way which ensures quality of attachment of the aperture plate for the full expected product life.

WO2012/046220 (Stamford Devices Ltd.) describes an aperture plate mounted on a support washer, and an annular piezo electric actuator is mounted on the washer to cause displacement of the support washer and hence vibration of the aperture plate. The piezo actuator is mounted using an electrically conductive epoxy adhesive. The aperture plate is attached to the support washer by a thermal means such as brazing. Brazing is an effective process. It is, however, difficult to scale to high-volume manufacture, due to the complexity and sensitivity of the process equipment.

WO2007/012215 (Boegli Gravures S A) describes use of laser treatment to provide grid-like structures on a surface, by laser irradiation using laser pulse lengths being in the nanosecond to femtosecond range. An adhesive may be applied after laser irradiation.

DE102009017492 (Edag GmbH) describes laser beam structuring of surfaces before application of an adhesive.

EP3127616 (Pari) describes an approach in which some of the surface of a support is laser structured before application of adhesive and attachment of an aperture plate. The structuring provides a dimpled pattern on the support surface.

JPS59132964 (Matsushita Electric) describes an atomizing pump for liquid fuels with a nozzle plate bonded to a housing body. The nozzle plate supports a piezoelectric element and is bonded by adhesive to the housing body with assistance of an adhesive which may partially surround the plate at its edge in a wave pattern or extend through apertures.

US2011233302 (Micro Base Technology Corporation) describes a nebulizing assembly including a nebulizing plate on a base, the nebulizing plate having a radially outer area formed as a gluing section which is perforated with glue holes. A piezoelectric driving element is stacked on top of the nebulizing plate and is attached to the gluing section of the nebulizing plate.

CN201371109 (Health & Life Co.) describes a micro-droplet generating device comprising an oscillation piece, a connecting piece, and a spray orifice piece clamped between the oscillation piece and the connecting piece. The spray orifice piece has penetration holes so that a jointing material can join the oscillation piece and the connecting piece through the penetration holes.

US2013112770A1 (Micro Base Technology Corporation) describes a nebulization structure including a driving element, a structure plate and a nebulization plate clamped between the driving element and the structure plate. The structure plate has glue overflow slots.

Polymer or epoxy resin adhesives may be used for adhesive attachment. However, problems may arise due to metal-to-polymer interaction of dissimilar materials when forming a bond. Also, the surface energy of polished material results in poor 'Specific Adhesion' (molecular attraction between contacting surfaces). The lower the surface energy, the weaker the attractive forces. Also, the range of types of adhesives which can be used is limited.

The invention is directed towards providing an improved method of attaching vibratable elements to supports, especially the aperture plate to its support in an aerosol generator.

SUMMARY OF THE INVENTION

We describe aerosol generator comprising:
- an aperture plate, and
- a support for the aperture plate,
- wherein the aperture plate is bonded to the support by an adhesive, and said adhesive is anchored in anchor grooves in at least one of the aperture plate and the support.

Preferably:
- the anchor grooves are in a surface of the aperture plate, in a circumferential rim having a circumferential aperture plate edge, and
- the anchor grooves are radially arranged in said aperture plate rim at or near said circumferential edge.

Preferably, the support is annular, and the aperture plate rim overlaps an internal edge of the annular support.

Optionally, the aerosol generator comprises a vibration generator mounted on the annular support.

We also describe a nebulizer comprising an aerosol generator of any embodiment, a housing to which the support is mounted, and a drive circuit providing drive power to the vibration generator.

We also describe a method of attaching an aerosol generator aperture plate to a support, the method comprising:
- machining anchor grooves in a surface of at least one of said aperture plate and support, the grooves having a depth in the range of 10 μm to 40 μm and a width in the range of 20 μm to 150 μm; and
- applying adhesive to said anchor grooves or to an opposing surface of the other of the aperture plate or support, and
- pressing the aperture plate and support together.

Preferably, the anchor grooves are machined by laser, abrasive waterjet, electro forming, chemical etching, bead blasting or mechanical machining.

Preferably, said anchor grooves are machined in a rim of said aperture plate.

Additional Statements

We describe an apparatus comprising:
- a vibratable element, and
- a support for the vibratable element,
- wherein the vibratable element is bonded to the support by an adhesive, and said adhesive is anchored in anchor grooves in at least one of the vibratable element and the support.

In one aspect:
- the anchor grooves are in the vibratable element,
- the vibratable element has a circumferential edge, and the anchor grooves are radially arranged in a rim at or near said circumferential edge.

The vibratable element may be an aperture plate for aerosolization, or a medical device diaphragm.

In one aspect:

the apparatus is an aerosol generator, and the vibratable element is an aperture plate for generating aerosol, said aperture plate having a rim.

Preferably:

the support is annular, in the form of a washer, and the aperture plate rim is attached to an inner edge of the annular support.

Preferably, the anchor grooves are substantially parallel.

The anchor grooves may have a depth in the range of 10 μm to 40 μm.

Preferably, the depth of at least some anchor grooves is in the range of 15% to 60% of the thickness of the element. Preferably, in the depth of at least some anchor grooves is in the range of 30% to 40% of the thickness of the element. Preferably, at least some of the anchor grooves have a width in the range of 20 μm to 150 μm.

Preferably, at least some of the anchor grooves have a width in the range of 40 μm to 120 μm.

Preferably, at least some of the anchor grooves have an angular pitch in the range of 2.5° to 12.5°.

Preferably, at least some of the anchor grooves have at least one bend in direction. At least one bend may have an angle in the range of 45° to 120°, and preferably in the range of 80° to 105°.

Preferably, at least some of the grooves comprise a plurality of bends, forming a zig-zag pattern in plan.

The anchor grooves may be in a rim of the vibratable element, and the ratio of area in plan of the rim to the main body of said element within the rim may be in the range of 20% to 60%.

Preferably, said anchor grooves are in a rim of the vibratable element, wherein the ratio of area in plan of said anchor grooves to area in plan of the rim is in the range of 20% to 60%, and preferably 30% to 50%.

In one example, the support does not have anchor grooves and its surface is substantially planar.

In another example, the vibratable element comprises Palladium and/or Nickel material.

The adhesive may be selected from a one or two-part adhesive capable of bonding two substrates, and is preferably a one-part epoxy adhesive.

Preferably, the adhesive forms a fillet between the vibratable member and the support adjacent said anchor grooves.

In one example, the support has a curved edge surface adjacent the vibratable element at the anchor grooves, and said fillet is between said surface and the anchor grooves. Preferably, said support curved surface is convex.

We also describe a method of attaching vibratable element to a support, the method comprising:

machining anchor grooves in a surface of at least one of said vibratable element and support, the grooves having a depth in the range of 10 μm to 40 μm and a width in the range of 20 μm to 150 μm; and applying adhesive to said anchor grooves or to an opposing surface of the other of the element or support, and pressing the element and support together.

Preferably, the anchor grooves are machined by laser, abrasive waterjet, electro forming, chemical etching, bead blasting or mechanical machining.

Preferably, said anchor grooves are machined in a rim of said vibratable element.

Preferably, the vibratable element is an aperture plate, and the support is in the form of a washer.

We also describe an aerosol generator comprising an apparatus of any embodiment, in which the vibratable element is an aperture plate or membrane for aerosolization.

DETAILED DESCRIPTION OF THE INVENTION

The invention will be more clearly understood from the following description of some embodiments thereof, given by way of example only with reference to the accompanying drawings in which.

AEROSOL GENERATOR

Figure 1:
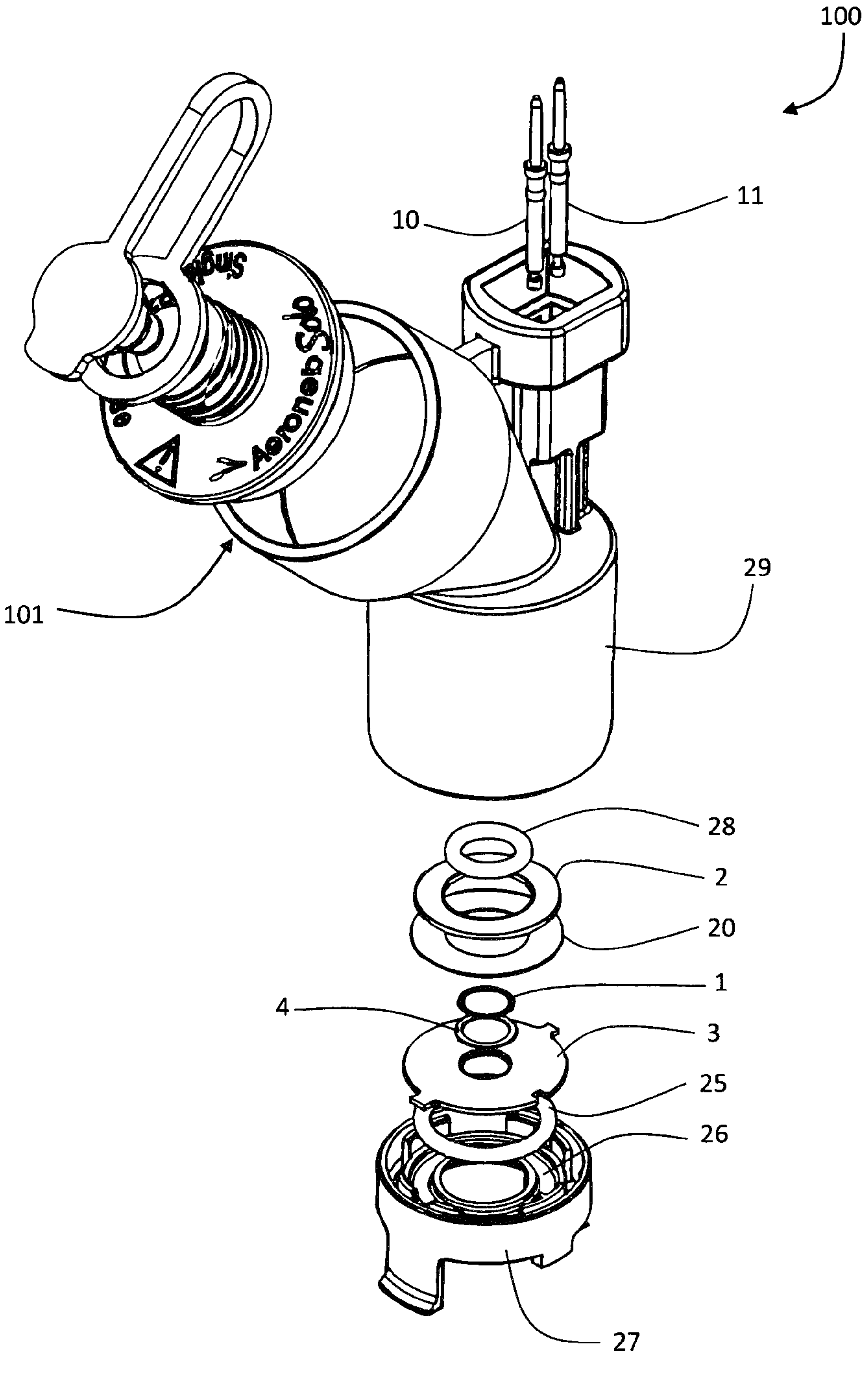
FIG. 1 is an exploded view of an aerosol generator.
Figure 2:
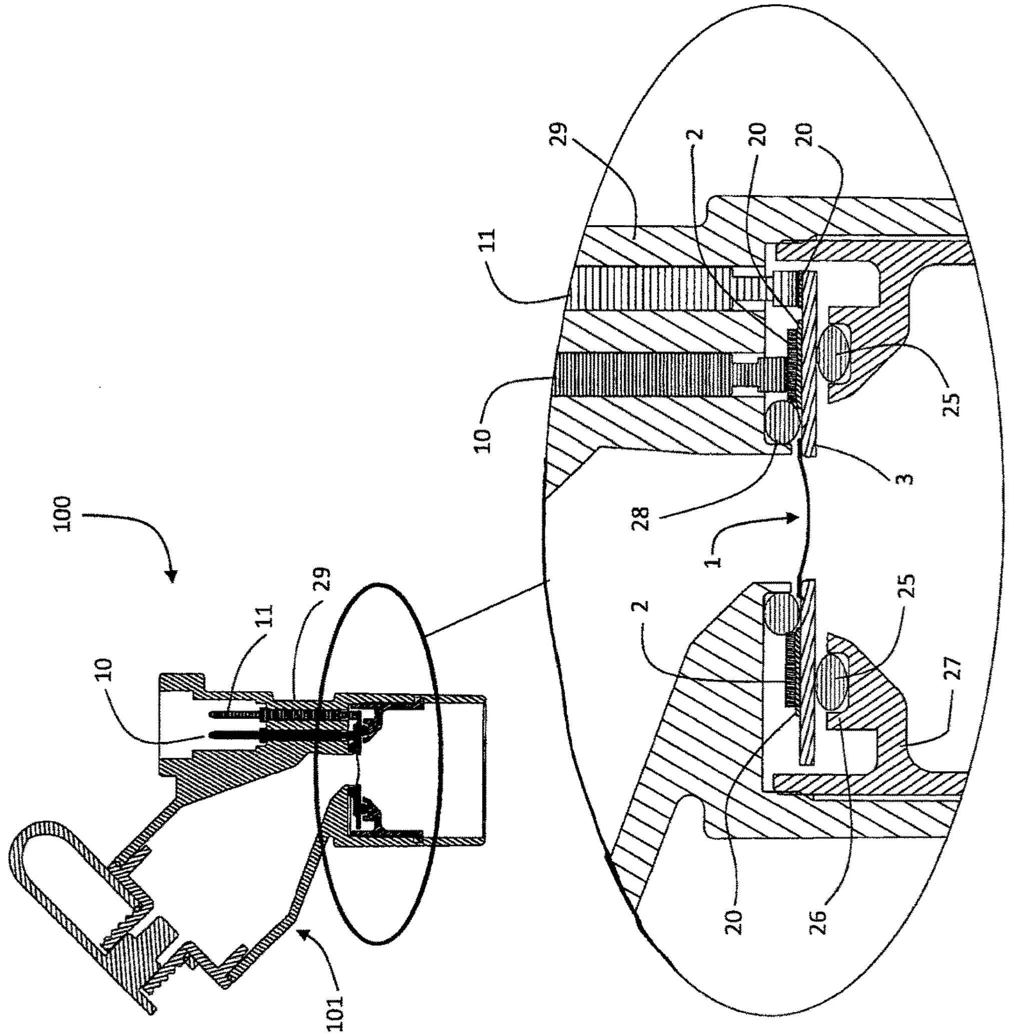
FIG. 2 is an enlarged view showing the completed assembly of the aperture plate and support.

Referring to FIGS. 1 and 2 an aerosol generator 100 comprises a housing 101 containing a vibratable element in this case an aperture plate ("AP") 1 of Palladium and Nickel material, a piezoelectric vibration generator or actuator ("piezo") 2, and a stainless steel (Hastelloy) support washer 3. The piezo 2 and the aperture plate 1 are supported by the support washer 3. The manner of attachment of the aperture plate 1 to the washer 3 is described in more detail below.

The apertures in the aperture plate 1 are sized to aerosolise a liquid such that the majority of the droplets have a size of less than 6 μm. The aperture plate could be non-planar, and may be dome-shaped in geometry. The apertures extend from a first, upper, liquid-contacting surface, to a second, lower, surface from which aerosolized droplets flow according to the well-known principle of aerosolization.

Electrical power is supplied to the piezo 2 in this case by a first conducting pin 10 in direct contact with the upper surface of the piezo 2 and a second conducting pin 11 is in electrical contact with the upper surface of the support washer 3 via conductive adhesive 20 on a tab of the support washer 3. The support washer 3 and the conductive adhesive 20 are in turn in electrical contact with the lower surface of the piezo 2. An electrically conductive liquid adhesive 20 is used to attach the underside of the piezo 2 to the washer 3.

The support washer 3 in turn engages against a lower O-ring 25 which is housed in a groove 26 of a support housing 27. The support washer 3 also engages against an upper O-ring 28 in the upper part 29 of the main housing. The support washer 3 is therefore sandwiched between the upper O-ring 28 and the lower O-ring 25. This subassembly is in turn sandwiched between the housing part 29 and a lower retainer clip 27. The arrangement of the lower retaining clip 27 provides uniform support around the support washer 3, counter-balanced by the support forces applied via the O-ring 28 and the pins 10 and 11.

The arrangement for attachment of the components is in this embodiment as described in WO2012/046220, with the exception of attachment of the aperture plate 1 to the support washer.

Typically, the piezo 2, when electrically excited, vibrates at approximately, 134 kHz or 128 kHz for example. Nebulisers incorporating the aerosol generator of the invention must be able to perform in a wide range of modes of use. Such nebulizers are often used intermittently over a 28-day period or can be used continuously for up to 7 days. The environment within the aerosol generator is therefore very harsh, requiring a very reliable and uniform attachment of the aperture plate to the washer.

Attachment of Aperture Plate to Support Washer

Figure 3:
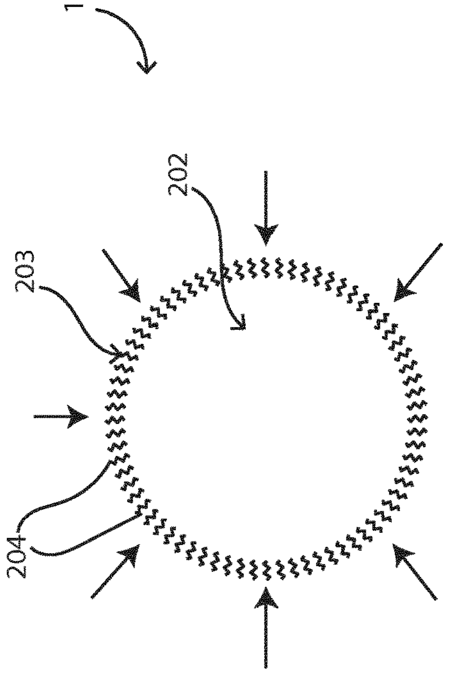
FIG. 3 is a diagram illustrating in general terms a pattern of micro-machined anchor grooves in a surface around a rim of the aperture plate for attachment by adhesive to the support washer.

Referring to FIG. 3, the aperture plate 1 has a main body 202 with apertures of approximately 6 μm diameter and with a density of approximately 93 per $mm^2$ (if the manufacturing uses photo-defined masking the density may be much higher, in the order of thousands per $mm^2$ as described for example in WO2012/092163). Around this body there is a rim 203 having a lower surface attached to the support washer 3.

The AP1 is directly supported on the support washer 3 laterally internally of the O-ring 28 and the piezo 2, without any mechanical clamping. Despite the fact that there is no clamping, and indeed the high-frequency operating conditions, the joint between the rim of the AP 1 and the washer 3 is very effective for a long product life. This is primarily due to grooves in the surface of the AP, which assist adherence as described in more detail below.

The AP 1 rim 203 is micro-machined in the lower surface to have multiple parallel anchor grooves each groove having a pair of side surfaces and a base surface, the base surface being substantially in the plane of the AP. The grooves are in the lower surface, extend generally in the radial direction, and have a zig-zag pattern as viewed in plan, with straight lengths between bends. The micro-machining pattern is shown only diagrammatically in FIG. 3, but more detail for some embodiments is provided in FIGS. 4 and 5.

Figure 4:
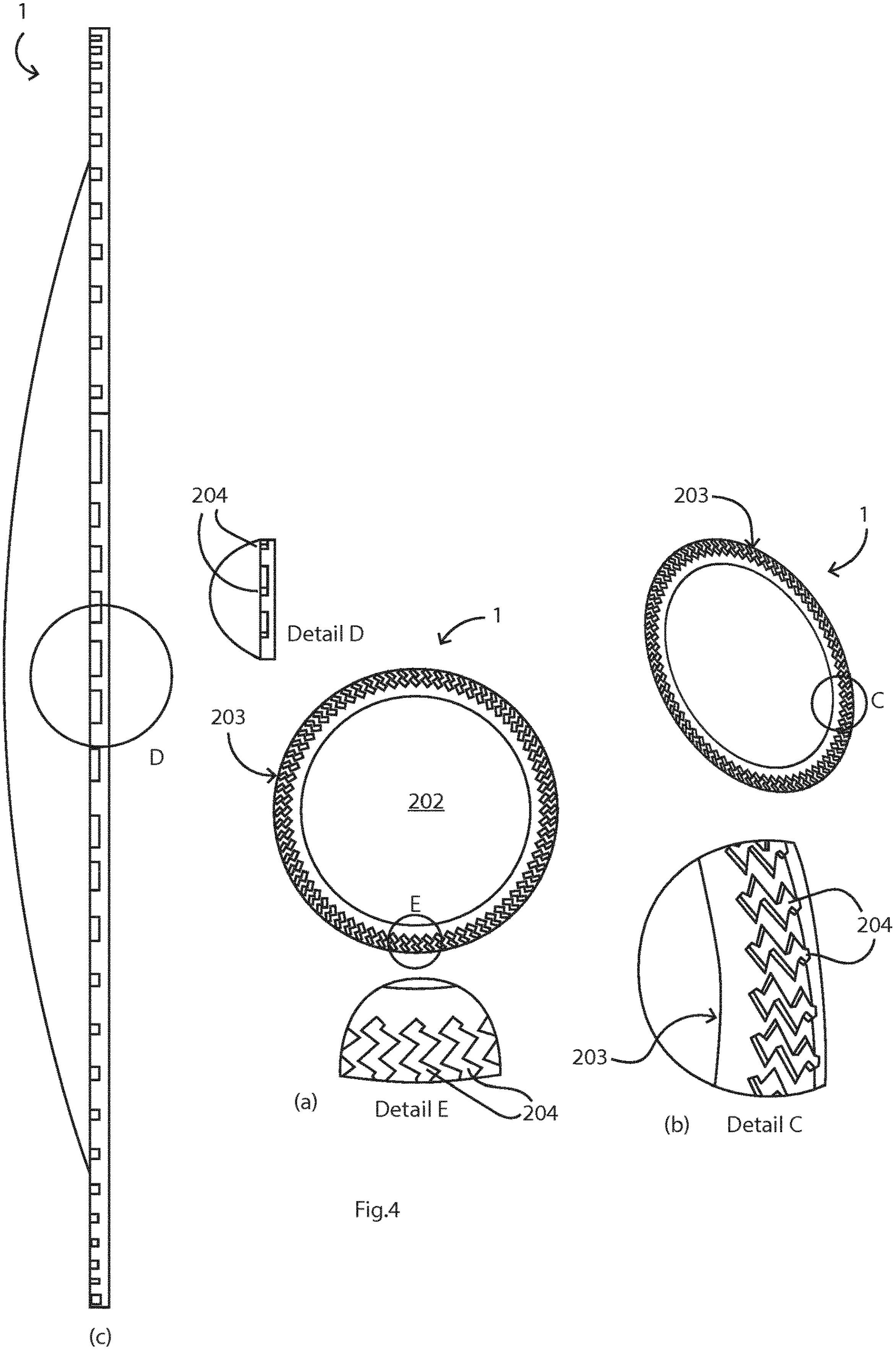
FIG. 4 is a set of views showing the aperture plate in more detail, including (a) plan, along with magnified view portion; (b) perspective, along with magnified view portion; (c) side, along with magnified view portion.

Referring to FIG. 4 the aperture plate 1 has grooves 204 in this pattern, in the rim 203.

The ratio of the area in plan of the rim 203 to the (apertured) body 202 is preferably in the range of 20% to 60%, and in this embodiment is 51%. The ratio of the area in plan of the grooves to the rim 203 is also preferably 20% to 60% and more preferably in the range of 30% to 50%.

The groove 204 parameters are:

radial (angular) pitch, 5°;
width, 100 μm;
depth, 20 μm;
length, 500 μm;
linear intervals, 5;
direction changes (bends), 4; and
angle transition (bend angles), 71.5°.

The anchor groove depth is preferably in the range of approximately 15% to 60% of the thickness of the rim, and more preferably in the range of 30% to 40% of the thickness.

In this case the zig-zag pattern of each groove has four direction changes, each of about 72°. However, there may be more or fewer bends. In other embodiments there are no bends, the grooves being straight, however, this is not preferred. Each bend preferably has an angle in the range of 45° to 105°, and more preferably the range of 70° to 80°.

Also, it is preferred that the anchor grooves extend out to the edge of the rim of the aperture plate. However, it is envisaged that at least some may be closed at both ends.

Also, each groove is preferably elongate, having an aspect ratio of greater than 1.1:1, and preferably at least 2:1. At least some anchor grooves may have a vent opening instead of or in addition to being open at the edge of the rim.

Figure 5:
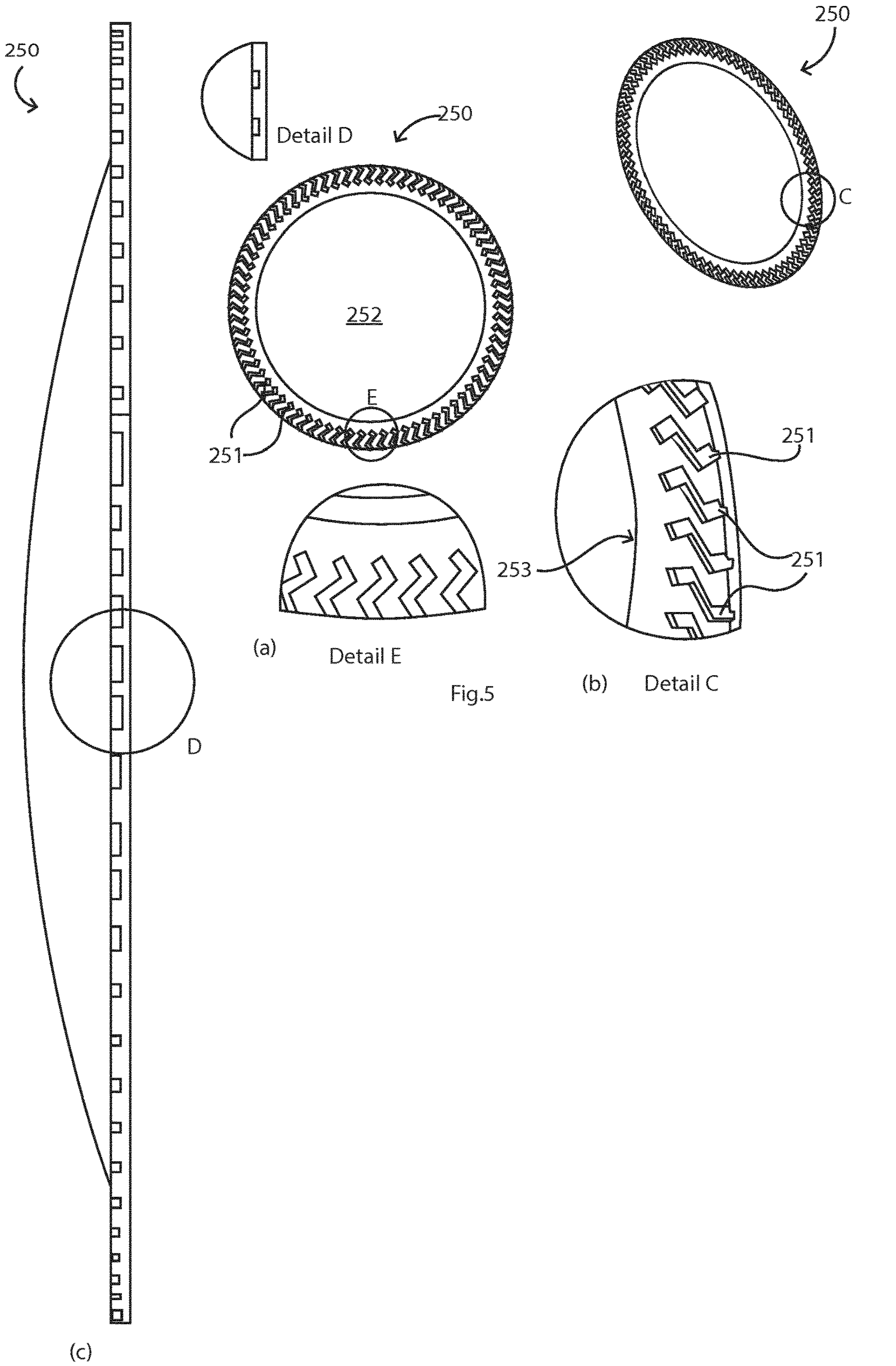
FIG. 5 is a similar set of views for an alternative aperture plate, in which the pitch (angular and circumferential separation) of anchor grooves is larger and there are only two bends in the zig-zag pattern.

Referring to FIG. 5 an alternative aperture plate, 250 has an apertured main body 252 and a rim 253 with grooves 251 on the support-contacting side. In this case the parameters are:

radial (angular) pitch, 10°;
width, 100 μm;
depth, 20 μm;
length, 400 μm;
linear intervals, 3;
direction changes, 2; and
angle transition, 100°.

FIG. 5 shows merely one example of another configuration of anchor grooves. In general terms, the scope of the invention includes grooves of a wide variety of different configurations, having none, one, two or more than three bends.

In general, it is preferred to have as high a density of grooves as possible, consistent with maintaining sufficient mechanical strength in the aperture plate, especially at the rim where it is attached to the washer. For example, there are 72 grooves in one example, and it is preferred that there are in the range of 30 to 130 grooves.

In general, it is preferred that the anchor grooves have a depth in the range of 10 μm to 40 μm, a width in the range of 20 μm to 150 μm, an angular pitch in the range of 2.5° to 12.5°, and that they have at least one bend in direction, and each bend is at an angle in the range of 45° to 120°, and preferably in the range of 80° to 105°.

Figure 6:
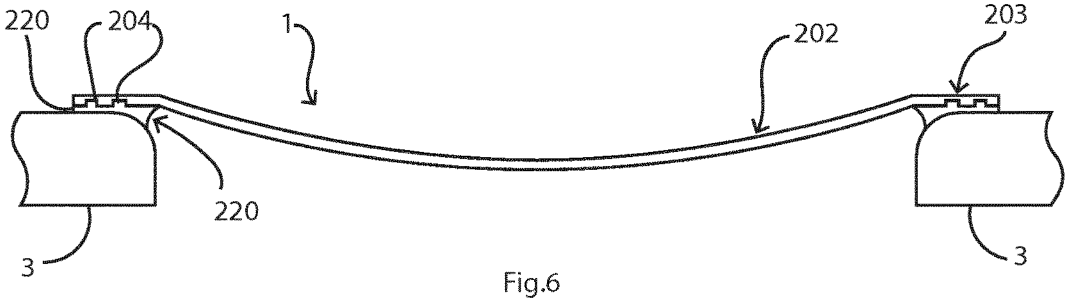
FIG. 6 is a diagrammatic side view showing relationship between the aperture plate, the anchor grooves, the adhesive, and a support washer.
Figure 7:
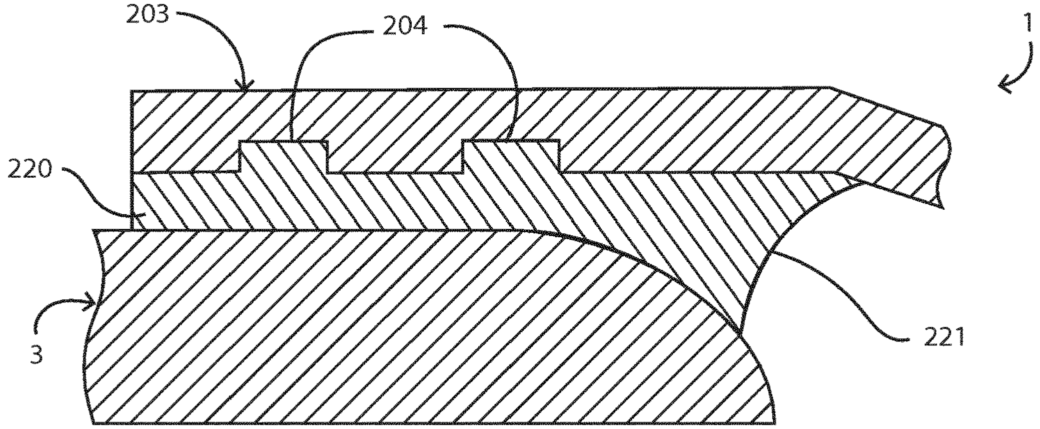
FIG. 7 is an enlarged view showing one side in more detail.

Referring to FIGS. 6 and 7 the aperture plate 1 and its attachment to the support washer 3 are shown in more detail. As discussed above, the aperture plate 1 main body 202 comprises a rim 203 around the body 202, the rim 203 providing a lower surface for attachment to the support washer 3. The anchor grooves of the rim 203 are viewed in two places in radial sectional view, but this may be different for other groove configurations in terms of their density and width. These views show adhesive 220 applied to the rim 203 on the underneath side between the rim 203 and the washer 3.

The washer is sloped away from the plane of the aperture plate with a convex curvature as viewed in cross-section. Advantageously, the adhesive 220 forms a fillet 221 where the washer bends away from the lower surface of the aperture plate. This provides excellent mechanical strength with integration of the washer to the aperture plate.

Without micro-machined anchor grooves the bond strength relies on 'specific adhesion' or the molecular chemical attraction between contacting surfaces. This results in good energy transfer between parts, but poor bond strength. When the grooves are micro-machined into the surface of the aperture plate rim they add 'mechanical adhesion' or the physical interlocking of component particles. The combination of specific and mechanical adhesion, referred to here as 'effective adhesion' has the effect of increasing anchorage of the adhesive, allowing for optimum bond strength and energy transfer.

The adhesive is preferably a one-part epoxy adhesive. It preferably has a bond strength of up to about 40 $N/mm^2$ and has good chemical resistance. Such one-part epoxy adhesives are available for example from Permabond, Araldite, Loctite or Masterbond. A two-part epoxy adhesive may alternatively be used, or indeed a structural acrylic adhesive, depending on the intended application.

The anchor grooves are large enough to allow the adhesive to flow and key into. This increases the mechanical adhesion of the adhesive due to the fact that the cured solid adhesive is anchored into the grooves. Also, the surface area of the bond is substantially increased.

Mechanical locking is shown in FIGS. 6 and 7. The geometry of the groves is such that the energy transfer from element to element, in this case displacement, can be optimised.

The failure mode is transferred to the adhesive itself, whereby the adhesive is shearing, leaving some adhesive on the washer and some on the aperture plate. This is a highly desirable bond characteristic and failure mode, as it reduces the number of variables to be controlled in the development of the process. The key process input becomes the adhesive itself, and its cured tensile strength.

In some cases the aperture plate itself breaks and the adhesive joint remains intact.

Figure 8:
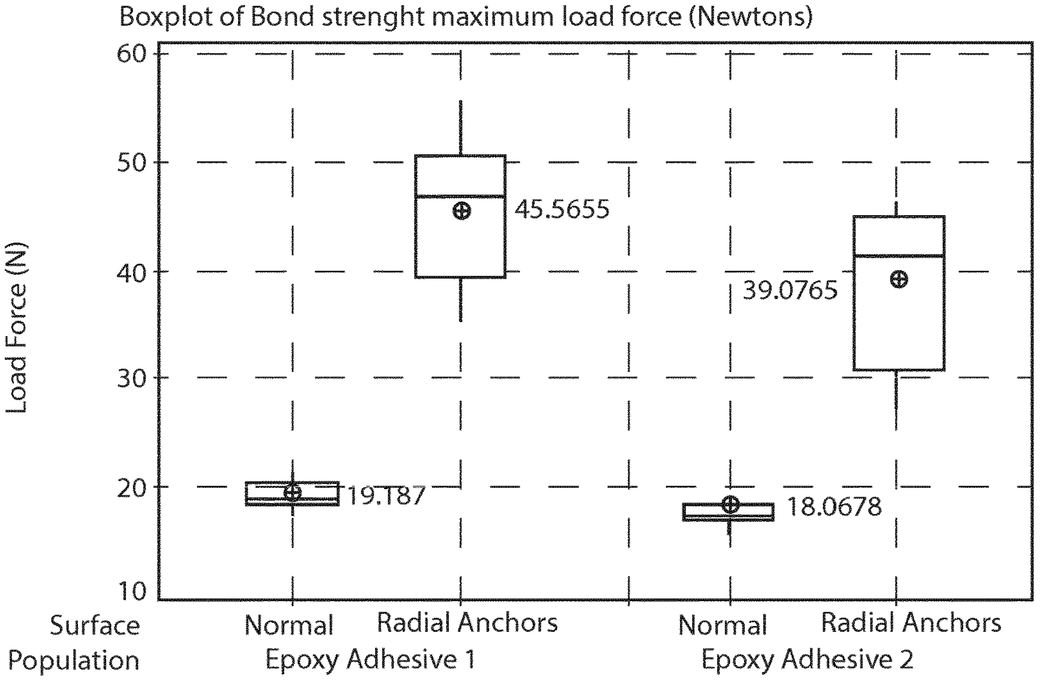
FIG. 8 is set of plots showing bond strength for different scenarios.

FIG. 8 shows a bond strength comparison of non-machined (non-grooved) vs. micro-machined (grooved) aperture plates FIG. 4. The plot gives an indication of the improvement in adhesive bond strength achieved by provision of the anchor grooves into the flange of the aperture plate. The maximum load force required to break the adhesive bond has been more than doubled in the samples with radial anchor grooves, in comparison to bonding without anchors in the surface. The values at the boxes are Newtons, the same as those of the vertical axis. It is noted that with the invention there is no need for mechanical clamping of the AP to the support, unlike several prior art approaches. By having the vibration actuator radially outside of the AP this may be positioned at any desired position for optimum vibration, physical space, and electrical connection requirements. Also, by avoiding a clamping arrangement there are no sharp transitions between parts of the AP which are totally immobile (relative to the support) and which are free to vibrate.

The laser cut radial anchor groove geometry directly influences energy transfer between the bonded substrates. We have found that the zig-zag pattern achieves better bonding strength than for example straight parallel groove patterns. The latter may cause weak points around the aperture plate ("AP") diameter that could result in an increase in fracturing as the plate vibrates. Hence, if straight anchor grooves are used they should be distributed for minimal impact on mechanical strength of the rim. Also, post tensile analysis also shows that the AP/adhesive bond fails and there is minimal sign of adhesive residue in the laser-cut grooves on the AP.

With the anchor groove zig-zag pattern, analysis shows that when the AP pulls away from the adhesive, some of the adhesive shears away with the AP. This demonstrates that there is better bonding to the AP and that the failure mode has changed from 'Aperture Plate detachment' to 'Adhesive Sheering'.

In order to achieve maximum bond strength the adhesive manufacturers recommend a minimum cured adhesive layer of between 50 μm and 100 μm. In order to provide this gap the aperture plate would sit higher above the substrate resulting in differences in energy transfer between components and a change in device operation. To negate the need for this additional gap the depth of the groove geometry can be chosen to provide a larger adhesive gap between bonded substrates within these anchor points. Due to the radial pattern design and radial displacement of the aperture plate, depth of the grooves does not impact on flange properties.

The bond strength which is achieved is significantly higher than if the adhesive were to engage in features other than grooves, such as through holes for example. If through holes were added, they would not provide much additional bonding as the material within the hole is removed and the adhesion would only be to the perpendicular walls of the hole.

We note that in a prior approach there are anchoring through holes, providing the likelihood that glue anchoring columns would be formed upwardly into the holes with some overflowing out the top of the glued element thereby forming a geometry similar to a rivet head. However, in other holes the glue may not fully penetrate through to the top. This would provide a lack of uniformity in adhesion. In other prior arrangements the vibrated element is sandwiched or clamped between two other elements in addition to the glue adhesion in the joint.

On the other hand in the invention the anchoring grooves provide anchor geometry for the glue to wick and latch into. They also significantly increase the surface area in contact with the glue and avoid the need for glue to have to ooze through to the top of the element to achieve similar anchoring. The zig-zag arrangement of the individual grooves ensures that the radial vibration of the piezo is transferred efficiently to the washer with minimal energy loss as might be a feature of short radial straight lines.

The radial arrangement of these individual zig-zag lines focuses the energy uniformly from the piezo to the centre of the aperture plate. Prototype test results indicate no requirement for passing the glue fully through the bonded aperture plate and also no requirement to clamp or sandwich the aperture plate using an additional third top element like an extra top washer. The distribution and quantity of grooves around the flange minimises the effect of some grooves perhaps not being fully filled in with glue.

The invention is advantageous to micro-bonding of components where repeatable reliable tensile strength is required and where high energy transfer is required across the bond joint. It is especially beneficial for metal-to-metal bonding. It can also be used in applications where a larger bond gap is required. Excellent bonding strength is achieved for long term reliable attachment in an environment of high frequency vibration and moisture and chemical corrosion.

The anchor grooves improve the adhesive bond in a similar way to standard hatching but do not create weak points around the outside diameter of the dome.

The piezoelectric element applies radial forces to the AP causing displacement of the dome. As the radial hatch pattern is radiating from the centre point of the AP, there is no weakening of the flange during this radial displacement.

Process for Micro Machining of the Aperture Plate

The anchor grooves are machined by diode-pumped solid-state laser ablation, but in other embodiments it may be achieved by laser technologies at the millisecond, nanosecond, picosecond or femtosecond pulse-width ranges, abrasive waterjet, electro forming, chemical etching, bead blasting or mechanical machining. It is also envisaged that the grooves may be provided in a photo-defined process with masking and etching such as described in WO2013/186031.

The preferred laser parameters for micro-machining are 5.0-6.5 W at a frequency in the range of 10-15 KHz.

The invention is not limited to the embodiments described but may be varied in construction and detail. For example, the invention may be applied to bonding of any other vibratable elements in an aerosol generator or other medical device. An example is attachment of a vibratory device such as a piezoelectric element to the support. Other examples are securement of electronic components, contacts or any surface mount technology that is subject to mechanical fatigue through usage such as surface mount buttons used in the nebuliser controller PCB. It is envisaged that the support washer may also be machined. In general, the invention is particularly suited to any application in which a vibratable element is driven at a high frequency, for example a diaphragm pump for medical applications. Also, the adhesive may be electrically conductive if it is required to act as part of a conducting path.

The grooves may be in either of the axially-facing upper or lower surfaces of the aperture plate rim. However it is preferred that they are in the lower, aerosol, side as illustrated.

The invention claimed is:

1. An aerosol generator comprising:
an aperture plate, and
a support for the aperture plate,
wherein the aperture plate is bonded to the support by an adhesive, and the adhesive anchors the aperture plate to the support by adhering a rim of the aperture plate to the support, the rim including a plurality of anchor grooves having a depth less than a thickness of the aperture plate.

2. The aerosol generator of claim 1, wherein the anchor grooves are formed by mechanical machining.

3. The aerosol generator of claim 2, wherein the anchor grooves have a depth in a range of 10 μm to 40 μm.

4. The aerosol generator of claim 2, wherein a depth of at least some anchor grooves is in a range of 15% to 60% of a thickness of the aperture plate.

5. The aerosol generator of claim 2, wherein at least some of the anchor grooves extend in a radial direction and have a plurality of bends forming a zig-zag pattern.

6. The aerosol generator of claim 5, wherein the zig-zag pattern has a plurality of direction changes in each of the anchor grooves.

7. The aerosol generator of claim 6, wherein each of the direction changes has an angle in the range of 70° to 80°.

8. The aerosol generator of claim 6, wherein each of the direction changes has an angle in a range of 45° to 105°.

9. The aerosol generator of claim 6, wherein the anchor grooves have a width of 100 μm.

10. The aerosol generator of claim 6, wherein the anchor grooves have a width in a range of 20 μm to 150 μm.

11. The aerosol generator of claim 6, wherein the anchor grooves are formed by diode-pumped solid-state laser ablation.

12. A nebulizer comprising:
an aerosol generator comprising:
an aperture plate, and
a support washer for the aperture plate,
wherein the aperture plate is bonded to the support washer by an adhesive, and the adhesive adheres between an underneath side of a rim of the aperture plate and a top surface of the support washer, at least the aperture plate including a plurality of anchor grooves, and
wherein the top surface of the support washer is sloped away from a plane of the rim of the aperture plate with a convex curvature as viewed in a cross-sectional view.

13. The nebulizer of claim 12, wherein the aperture plate further comprises a main body portion and the adhesive forms a fillet extending between the main body portion of the aperture plate and the support washer.

14. The nebulizer of claim 13, wherein the adhesive has a bond strength of approximately 40 $N/mm^2$.

15. An aerosol generator comprising:
an aperture plate having a circumferential rim including a plurality of anchor grooves having a depth less than a thickness of the aperture plate, at least some of the anchor grooves having a bend in direction; and
a support washer for the aperture plate, wherein the aperture plate is bonded to the support washer by an adhesive in contact with both the anchor grooves of the circumferential rim and the support washer.

16. The aerosol generator of claim 15, wherein the anchor grooves are elongate.

17. The aerosol generator of claim 16, wherein the anchor grooves have an aspect ratio of at least 2:1.

18. The aerosol generator of claim 15, wherein the anchor grooves have an angular pitch.

19. The nebulizer of claim 12, wherein the adhesive is an electrically conductive epoxy.

20. The nebulizer of claim 12, wherein at least some of the anchor grooves have a plurality of bends forming a zig-zag pattern.

* * * * *